May 12, 1970

G. J. MARCO ET AL 3,511,907

ANIMAL FEED COMPONENTS COMPRISING A BIOLOGICALLY ACTIVE
SUBSTANCE AND AN AMINOPOLYAMIDE RESIN

Filed Dec. 13, 1965

INVENTORS
ERNEST G. JAWORSKI
GINO J. MARCO
ERHARD J. PRILL

BY Donald J. Haefele

ATTORNEY

Patent 3,511,907

ANIMAL FEED COMPONENTS COMPRISING A BIOLOGICALLY ACTIVE SUBSTANCE AND AN AMINOPOLYAMIDE RESIN

Gino J. Marco, Webster Groves, Erhard J. Prill, St. Louis, and Ernest G. Jaworski, Olivette, Mo., assignors to Monsanto Company, St. Louis, Mo., a corporation of Delaware
Filed Dec. 13, 1965, Ser. No. 513,232
Int. Cl. A61k 17/00, 21/00, 27/12
U.S. Cl. 424—78                              6 Claims

ABSTRACT OF THE DISCLOSURE

A composition comprising a biologically active substance and an aminopolyamide resin, resistant to the action of rumen microflora.

---

Figure 1:
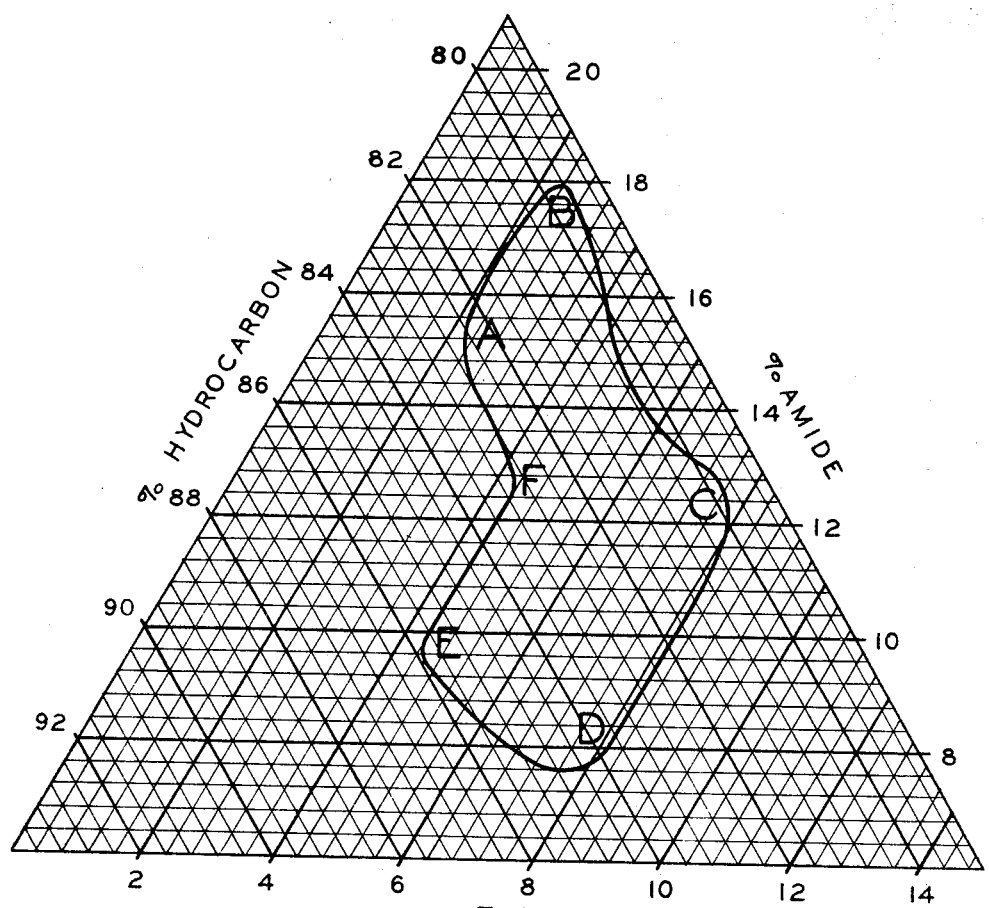

This application relates to additives for improving ruminant feeds and to novel feeds incorporating the useful additives. Many medicaments, pharmaceuticals and other biologically active substances are known to be useful in providing desirable effects when administered to animals. This administration may be effected intravenously, by subcutaneous introduction or by injection into muscular tissue. In some instances the biologically active substances are administered orally to non-ruminant animals and thereby introduced into the animal stomach, where they can provide their useful function. The oral procedure is usually not applicable to ruminant animals because the multifarious rumen microflora are so adaptable that they decompose many of the substances used in the treatment of non-ruminant animals.

The phrase "biologically active substances" as used in this specification and the appended claims defines a class of substances which are frequent components in animal feeds, or are otherwise administered to animals in the treatment of diseases, infections, malnutritions and other maladies. This class of substances includes nutrients, such as aminoacids, for example lysine, methionine and combinations of aminoacids; aminoacid analogues, such as methionine hydroxy analogue (hydroxyl radical in place of amino radical); antibiotics, such as procaine penicillin G, bacitracin, streptomycin, erythromycin, chlorotetracycline and oxytetracycline; sulfa drugs, such as sulfamethazine and sulfanilimide; sedatives, such as Amytol, phenobarbital, sodium pentabarbital, and cyclopentenyl barbituric acid; anthelmintics, such as phenothiazine and piperazine derivatives; antipyretics, such as aspirin and sodium salicylate; hormones such as the androgenic steroids, estrogenic steroids and hydrocortesone; hypoglycemic aggents, such as sulfonylureas and biguanides, for example N-(N-β-phenethylformamidinyl)amino urea and 1-(p-tolyl)-3-n-butylsulfonyl urea; and other compounds known to be useful, for example antispasmodics, hematics, laxatives, expectorants and other growth promoting agents. The biologically active substances can be used singly or in any desired combination.

A fundamental purpose of this invention is to provide a means for minimizing the contact of the rumen fluids with the biologically active substance and thereby avoid deleterious effects due to the action of the microflora. Some compositions used in treating animals inhibit or destroy the rumen microflora, and for this reason also it is desirable to prevent contact of the active substance with the rumen fluids.

Another purpose of the invention is to provide feed components in which a biologically active substance, and especially a rumen susceptible or destructive substance, is associated with a composition which is resistant to the action of the rumen microflora and which provides a barrier between the rumen microflora and said susceptible substance. This barrier can be a coating on the particles or globules of the biologically active substance, or a matrix in which the said particles or globules are suspended in such a manner that they are at least partially enclosed. The coatings or the matrices used in the practice of this invention must be resistant to the activity of the rumen microflora, but substantially soluble or dispersible in the gastric fluids. The barriers described hereinafter possess the desired properties.

A further purpose of the invention is to provide a complete feed comprising conventional ruminant feed components and in addition at least one biologically active substance provided with a protective barrier. In this manner a complete ruminant feed can be prepared, including components which are normally components in ruminant feeds, but which are useful for the purpose of their addition to conventional non-ruminant feeds. When the rumen susceptible biologically active substances are released, after passing through the rumen, they become available in the stomach. However, the retention of the feed components in the stomach is of limited duration, and substantial quantities of the medicants and other pharmaceuticals released in the stomach remain in the feed composition after leaving the stomach and these portions are available for the performance of some useful function in the intestinal tract.

There are many possible coating compositions which are chemically and biologically inert. If these are used they successfully resist the activity of the rumen microflora, but these are not capable of releasing the active component in the lower regions of the alimentary canal. It is the fundamental purpose of this invention to provide a composition which successfully passes the rumen and is still capable of releasing the biologically active substance in the stomach. It has been found that certain polyamide resins containing unreacted amine substituents have the requisite combination of properties. The amine containing polyamide resins useful in the practice of this invention are comprised essentially, if not entirely, of hydrocarbon moieties, amino nitrogen (—N=) and amide

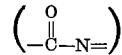

It has been found that polyamides with from 1.5 to 8.5 percent by weight of amine groups, from 79 to 86 percent by weight of hydrocarbon moiety with the balance of the 100 percent by weight being amide, have the necessary properties, provided that when the hydrocarbon moieties exceed about 83 percent by weight, the weight percent of amine moieties exceeds about 4.4 percent.

Figure 2:
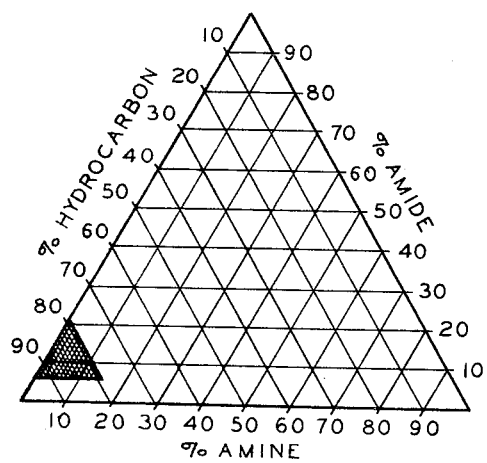

These critical proportions are defined graphically in the drawing of which FIGS. 1 and 2 are ternary diagrams of the polyamide compositions under consideration. The cross-hatched section of FIG. 2 includes the compositions useful in the practice of the invention. FIG. 1 is an enlargement of the cross-hatched portion of FIG. 2 and the area ABCDEF encloses the combinations of amine, amide and hydrocarbon moieties which constitute the preferred modifications of the useful polymers.

The useful amino polyamide resins described are prepared by the interreaction of polyamines and polycarboxylic acids in such proportions that some of the amino groups remain unreacted with the polycarboxylic acids. This means that in all instances the carboxylic acids are substantially completely reacted with an excess of the amino reactant.

The polyamide resins can contain interreacted a certain proportion of monofunctional amines and monocarboxylic acids which provide terminal groups for the polymer chains and thereby avoid excessive molecular weights. The interreaction of the monofunctional amines also serves to provide part of the excess amino group found to be essential to the operativeness of the polyamide resin.

Useful monofunctional amines include octadecyl amine, dodecyl ethyl amine,, lauryl amine, isooctyl amine, n-butyl amine and other alkyl amines of up to 22 carbon atoms, or mixtures thereof. The amines of higher molecular weights are often preferred. Useful monocarboxylic, acids include oleic acid, benzoic acid, abietic acid, pimaric acid, palmitic acid, caproic acid, butyric acid and other saturated or unsaturated acids of up to 22 carbon atoms or mixtures thereof. Since the preparation often involves heating at temperatures above the boiling points of some of the lower molecular weight monoamines and monocarboxylic acids, those of higher weights are usually more practicable.

Useful compounds can be prepared by condensing only diamines and dicarboxylic acids. With an excess of the diamine in order to have the required unreacted amino groups in the polymer, the reaction stops when substantially all of the carboxylic groups are converted to amide groups. Using an excess of the diamine so as to provide the desired number of unreacted amino groups, high molecular weights will be avoided, since the excess of diamine will act as the terminal groups on the polymer chains.

In preparing these two-reactant polymers, diamines, such as ethylene diamine, propylene diamine, tetramethylene diamine, phenylene diamine and the like, are reacted with only dicarboxylic acid, such as succinic acid, azelaic acid, adipic acid, isophthalic acid, suberic acid, pimelic acid, brassic acid, roccellic acid and the like. Under some circumstances it is desirable to provide in the polymers a high weight percent of hydrocarbon moiety, and for this purpose the higher molecular weight diamine or dicarboxylic acids should be used. Useful very high molecular weight dicarboxylic acids are those available in commerce as "dimer acid" which is the dimer of linoleic acid, reputed to have the structure:

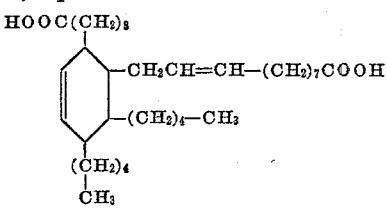

Similarly the dimer diamines can be prepared by the amidation of the dimer acid and subsequent hydrogenation to the diamine:

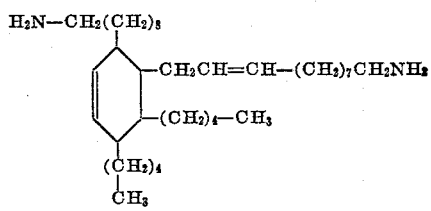

Additional amino nitrogens may be added by substituting all or part of the alkylene diamine with amines containing additional amino nitrogen, for example those with secondary or tertiary amine groups in the polymer chain. Suitable polyamines of this type include:

diethylene triamine
triethylene tetramine
imino-bis-isopropylamine
N-methyl imino-bis-isopropylamine
tetraethylene pentamine
imino-bis-propylamine
N-octyl imino-bis-propylamine
N-octadecyl imino-bis-propylamine
N,N'-bis-3-aminopropyl-1,4-xylylenediamine
2-methyl-4-aminomethyl-heptamethylenediamine
N,N'-bis(3-aminopropyl)hexamethylenediamine
2-methyl-4-aminomethyl-heptamethylenediamine
N,N'-bis(3-aminopropyl)-1,4-xylenediamine
N,N'-bis(3-aminopropyl)stearylamine
4-amino-4-methylheptamethylene diamine
N-aminoethyl piperazine
1,2,3-tris(3-aminopropyloxy)propane Higher molecular weight polyamines may be prepared by the cyanoethylation of the dimer diamine and subsequent hydrogenation to form dimer tetramines of the structure:

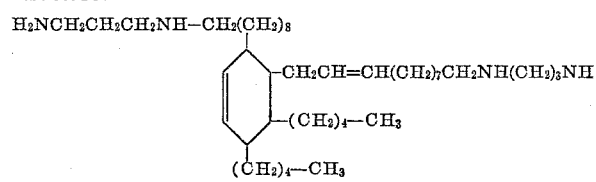

This compound is hereinafter identified by the term "dimer tetramine."

The amide nitrogen content can be increased by using dicarboxylic acids which have been condensed with two moles of a diamine whereby a diamine with amide linkages is prepared. For simultaneously increasing both the amide and hydrocarbon moiety, the dimer acids of linoleic acid may be condensed with two moles of a diamine. Useful high molecular amines with amide linkages can be prepared by reacting two moles of a simple diamine, for example ethylene diamine, with the dimer acid described above. This polymeric reactant has the structure:

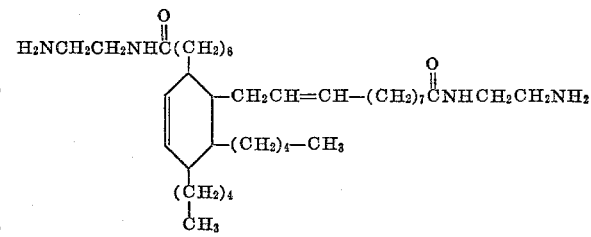

The amide moiety can thus be increased without increasing the amine content and with only slight increases of the hydrocarbon moiety of aminoacids in the polymerization mixture. One mole of the aminoacid can be reacted with either available amine group, and the product will have the same amino functions with higher amide and hydrocarbon content.

Alternatively the same polymers can be prepared from the acid chlorides of the dicarboxylic acids by reaction with the diamines. In this instance HCl will be evolved instead of the water evolved by the several procedures above described.

In the above described polymers branched chains may be present which will not seriously affect the properties of the polymers as long as the amine, amide and hydrocarbon contents are within the prescribed limits. Thus trifunctional reactants such as tricarboxylic acids and triamines will form branched polymers useful in practicing the invention.

In the conduct of the polymerization all of the reagents may be charged initially or they may be added successively. If the reagents are charged in the amounts required to provide the desired content of the three moieties, the polymerization will proceed by heating to a fluid state. In most instances the polymers will solidify on cooling, but if they are tacky solids or viscous liquids, these apparently undesirable properties can be avoided by the formulation procedure. Inert fillers can be used to solidify the semi-solid polymers or viscous liquids. For this latter purpose starch, plaster of Paris, chalk, talc, clays, silica, alumina and carbon black may be used.

Frequently, when the polymer is mixed with the biologically active agent, any objectionable viscosity or tackiness of the resin may be obviated. This formulation usually involves melting the polymer and gradually adding the active agent to the melt. The proportions used can vary from 0.1 to 99% of the active agent depending upon the contemplated dosage and the quantity of feed to be treated. Semi-liquid or tacky polymers can be utilized with larger proportion of the active agents, which serve to solidify the molten mix. The melted formulation is then poured onto a cold surface, into water or Dry Ice to effect solidification.

The polymer incorporating the active agent is ground and screened to the desired size. The optimum particle size is one to two millimeters in diameter. Larger particles may be undesirable because they tend to settle in the rumen and smaller particles are too easily leached of their active component by the rumen fluid.

The following table sets forth the molar proportions of reactants condensed in the preparation of polyamides by the above-described procedures.

TABLE I.—AMINE-CONTAINING POLYAMIDE RESINS

| Resin No. | Reactants | Equivalents |
|---|---|---|
| 1 | Dimer acid [1] | 0.500 |
|  | Diethylene triamine | 0.570 |
|  | Triethylene tetramine | 0.572 |
|  | Oleic acid | 0.100 |
| 2 | Dimer acid [1] | 0.400 |
|  | Azelaic acid | 0.100 |
|  | Diethylene triamine | 0.810 |
|  | Hexamethylene diamine | 0.060 |
|  | Oleic acid | 0.100 |
| 3 | Dimer acid [1] | 0.400 |
|  | Azelaic acid | 0.300 |
|  | Diethylene triamine | 0.930 |
|  | Hexamethylene diamine | 0.180 |
|  | Oleic acid | 0.100 |
| 4 | Dimer acid [1] | 0.600 |
|  | Azelaic acid [1] | 0.800 |
|  | Diethylene triamine | 1.650 |
|  | Hexamethylene triamine | 0.500 |
|  | Oleic acid | 0.100 |
| 5 | Dimer acid [1] | 0.253 |
|  | Azelaic acid | 0.080 |
|  | Ethylene diamine | 0.213 |
|  | Diethylene triamine | 0.281 |
|  | Pelargonic acid | 0.0667 |
| 6 | Isophthalic acid | 0.267 |
|  | Ethylene diamine | 0.100 |
|  | Dimer tetramine [7] | 0.233 |
|  | Benzoic acid | 0.067 |
| 7 | Dimer acid [1] | 0.253 |
|  | Azelaic acid [1] | 0.080 |
|  | Diethylene triamine | 0.320 |
|  | Triethylene tetramine | 0.225 |
|  | Oleic acid | 0.067 |
| 8 | Dimer acid [1] | 0.267 |
|  | Diethylene triamine | 0.180 |
|  | Triethylene tetramine | 0.416 |
|  | Dimer tetramine [7] | 0.107 |
|  | Oleic acid | 0.067 |
| 9 | Dimer acid [1] | 0.200 |
|  | Triethylene tetramine | 0.399 |
|  | Dimer tetramine [7] | 0.227 |
|  | Oleic acid | 0.067 |
| 10 | Dimer acid [1] | 0.267 |
|  | Tetraethylene pentamine | 0.650 |
|  | Dimer tetramine [7] | 0.267 |
|  | Oleic acid | 0.033 |
| 11 | Dimer acid [1] | 0.250 |
|  | Tetraethylene pentamine | 0.900 |
|  | Oleic acid | 0.050 |
| 12 | Dimer acid [1] | 0.200 |
|  | Azelaic acid | 0.200 |
|  | Diethylene triamine | 0.669 |
|  | Triethylene tetramine | 0.520 |
|  | Oleic acid | 0.0667 |
| 13 | Dimer acid [1] | 0.250 |
|  | Diethylene triamine | 0.053 |
|  | Triethylene tetramine | 0.558 |
|  | Dimer tetramine [7] | 0.100 |
| 14 | Dimer acid [1] | 0.400 |
|  | Azelaic acid | 0.100 |
|  | Diethylene triamine | 0.600 |
|  | Hexamethylene diamine | 0.200 |
|  | Pelargonic acid | 0.040 |
|  | Oleic acid | 0.020 |
| 15 | Dimer acid [1] | 0.452 |
|  | Azelaic acid | 0.080 |
|  | Diethylene triamine | 0.843 |
|  | Hexamethylene diamine | 0.108 |
| 16 | Dimer acid [1] | 0.2667 |
|  | Triethylene tetramine | 0.200 |
|  | Tetraethylene pentamine | 0.235 |
|  | Dimer tetramine [7] | 0.328 |
|  | Oleic acid | 0.0333 |

TABLE I.—CONTINUED

| Resin No. | Reactants | Equivalents |
|---|---|---|
| 17 | Dimer acid [1] | 0.258 |
|  | Diethylene triamine | 0.117 |
|  | Triethylene tetramine | 0.488 |
|  | Dimer tetramine [7] | 0.104 |
|  | Oleic acid | 0.0333 |
| 18 | Dimer acid [1] | 0.350 |
|  | Azelaic acid [1] | 0.050 |
|  | Diethylene triamine | 0.378 |
|  | Triethylene tetramine | 0.448 |
|  | Dimer tetramine [7] | 0.056 |
| 19 | Dimer acid [1] | 0.300 |
|  | Azelaic acid | 0.400 |
|  | Diethylene triamine | 0.591 |
|  | Hexamethylene diamine | 0.396 |
|  | Pelargonic acid | 0.057 |
|  | Oleic acid | 0.043 |
| 20 | Dimer acid [1] | 0.300 |
|  | Azelaic acid | 0.400 |
|  | Diethylene triamine | 0.495 |
|  | Hexamethylene diamine | 0.460 |
|  | Oleic acid | 0.100 |
| 21 | Dimer acid [3] | 0.368 |
|  | Azelaic acid | 0.032 |
|  | Tetraethylene pentamine | 0.800 |
|  | Triethylene tetramine | 0.320 |
| 22 | Dimer acid [3] | 0.396 |
|  | Azelaic acid | 0.118 |
|  | Diethylene triamine | 0.2592 |
|  | Triethylene tetramine | 0.8028 |
| 23 | Dimer acid [3] | 0.360 |
|  | Tetraethylene pentamine | 1.050 |
|  | Dimer tetramine [7] | 0.0864 |
| 24 | Trimer acid [4] | 0.240 |
|  | Duomeen CS [9] | 0.480 |
|  | Tetraethylene pentamine | 0.600 |
|  | Pelargonic acid | 0.020 |
|  | Oleic acid | 0.032 |
| 25 | Dimer acid [3] | 0.160 |
|  | Azelaic acid | 0.160 |
|  | Duomeen CS [9] | 0.800 |
|  | Pelargonic acid | 0.040 |
| 26 | Dimer acid [3] | 0.420 |
|  | Triethylene tetramine | 1.080 |
| 27 | Dimer acid [3] | 0.400 |
|  | Tetraethylene pentamine | 1.330 |
| 28 | Dimer acid [3] | 0.400 |
|  | Triethylene pentamine | 0.936 |
|  | Dimer diamine [6] | 0.0328 |
|  | Oleic acid | 0.050 |
| 29 | Dimer acid [3] | 0.320 |
|  | Diethylene triamine | 0.090 |
|  | Tetraethylene pentamine | 0.5485 |
|  | Duomeen CS [9] | 0.300 |
|  | Oleic acid | 0.040 |
| 30 | Dimer acid [3] | 0.1616 |
|  | Azelaic acid | 0.212 |
|  | Triethylene tetramine | 0.3468 |
|  | Duomeen CS [9] | 0.532 |
|  | Oleic acid | 0.0317 |
| 31 | Dimer acid [3] | 0.340 |
|  | Azelaic acid | 0.060 |
|  | Diethylene triamine | 0.600 |
|  | Tetraethylene pentamine | 0.1665 |
|  | Oleic acid | 0.030 |
| 32 | Dimer acid [3] | 0.440 |
|  | Azelaic acid | 0.040 |
|  | Diethylene triamine | 0.840 |
| 33 | Dimer acid [3] | 0.265 |
|  | Azelaic acid | 0.1346 |
|  | Diethylene triamine | 2.000 |
|  | Triethylene tetramine | 0.6656 |
|  | Oleic acid | 0.0667 |
| 34 | Dimer acid [3] | 0.305 |
|  | Azelaic acid | 0.1604 |
|  | Diethylene triamine | 0.798 |
|  | Oleic acid | 0.050 |
| 35 | Dimer acid [3] | 0.343 |
|  | Azelaic acid | 0.1234 |
|  | Diethylene triamine | 0.798 |
|  | Oleic acid | 0.0667 |
| 36 | Dimer acid [3] | 0.296 |
|  | Azelaic acid | 0.170 |
|  | Diethylene triamine | 0.600 |
|  | Hexamethylene diamine | 0.137 |
|  | Oleic acid | 0.067 |
| 37 | Dimer acid [3] | 0.304 |
|  | Azelaic acid | 0.096 |
|  | Tetraethylene pentamine | 1.200 |
|  | Oleic acid | 0.052 |
| 38 | Dimer acid [3] | 0.500 |
|  | Isophthalic acid | 0.500 |
|  | Diethylene triamine | 1.680 |
|  | Oleic acid | 0.180 |
| 39 | Dimer acid [1] | 0.2266 |
|  | Azelaic acid | 0.240 |
|  | Ethylene diamine | 0.333 |
|  | Diethylene triamine | 0.300 |
|  | Pelargonic acid | 0.0667 |
| 40 | Dimer acid [3] | 0.500 |
|  | Sebacic acid | 0.500 |
|  | Diethylene triamine | 1.680 |
|  | Oleic acid | 0.160 |
| 41 [15] | Duomeen T [8] | 0.100 |
|  | Adipoyl chloride | 0.300 |
|  | $C_{20}$ dicarbonyl chloride [13] | 0.300 |
|  | N,N-bis-3-aminopropyl dodecylamine | 0.750 |
|  | Palmitoyl chloride | 0.100 |

TABLE I.—CONTINUED

| Resin No. | Reactants | Equivalents |
|---|---|---|
| 42 | Dimerized rosin [5] | 0.300 |
|  | Oxy-bis-propionic acid | 0.200 |
|  | N,N-bis(carbomethoxyethyl) methyl amine | [10] 0.100 |
|  | Methylimino-bis-propyl amine | 0.750 |
|  | Tetraethylene pentamine | 0.500 |
| 43 [15] | Dimer tetramine [7] | 0.600 |
|  | Oxalyl chloride | 0.200 |
|  | Sebacyl chloride | 0.400 |
|  | Bis-hexamethylene triamine | 0.600 |
|  | Tetraethylene pentamine | 0.500 |
| 44 | Tetraethylene pentamine | 0.250 |
|  | Hydrogenated dimer acid [12] | 0.470 |
|  | Ethylene diamine | 0.300 |
|  | 1,4-xylylene diamine | 0.500 |
|  | N,N-bis(carbomethoxyethyl) methyl amine | [10] 0.330 |
|  | Benzoic acid | 0.050 |
| 45 | Dimer acid [3] | 0.400 |
|  | Tetraethylene pentamine | 1.000 |
|  | 2-methyl-4-aminomethyl-heptamethylene diamine [14] | 0.300 |
|  | Thio-bis-propionic acid | 0.100 |
| 46 | Dimer acid [3] | 0.350 |
|  | Adipic acid | 0.250 |
|  | Methyl imino-bis-propyl amine | 1.050 |
|  | Carbomethoxyethyl methyl octadecyl amine | [11] 0.050 |
|  | Abietic acid | 0.050 |
| 47 | Dimer acid | 1.00 |
|  | Triethylene tetramine | 1.33 |

[1] Commercial dimer acid containing 95% dimers, 4% trimers and 1% monomers; ave. Neut. Eq.=292.
[2] A commercial dimer acid containing 75% dimers, 22% trimers and 3% monomers; ave. Neut. Eq.=295.
[3] Commercial dimer acid (Note 1) containing 2.9% of added oleic acid.
[4] A commercial trimer of $C_{18}$ unsaturated fatty acids.
[5] A commercial polymerized rosin consisting of approximately 80% rosin acid dimers and 20% monomeric rosin acids and neutral material; Acid No.=148.
[6] A diamine which corresponds to dimer acid; Eq. Wt.=290.
[7] A tetramine prepared by hydrogenation of bis-cyanoethylated diamine of dimer acid (Note 6); Eq. Wt.=180.
[8] N-($\gamma$-aminopropyl)-tallow amine; Neut. Eq.=173

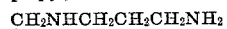

[9] 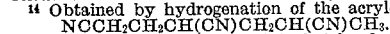, where $x+y=16$.
[10] As a dicarboxylic acid.
[11] As a monocarboxylic acid.
[12] Available by hydrogenation of commercial dimer acid (Note 1).
[13] The acid chloride prepared from a $C_{20}$ dicarboxylic acid, a major constituent of which is linear-$\alpha$-$\omega$-dicarboxylic acid.
[14] Obtained by hydrogenation of the acrylonitrile trimer, $NCCH_2CH_2CH(CN)CH_2CH(CN)CH_3$.
[15] Resins prepared using an interfacial polymerization technique.

The above described aminopolyamides were studied to determine their dispersibility in rumen, gastric and intestinal fluids whereby their utility as protective barriers can be evaluated. The following table shows the behavior of the various aminopolyamide resins in the presence of said fluids.

TABLE II.—COMPOSITION AND DISPERSIBILITY OF AMINO-POLYAMIDES

| Resin No. | Composition, percent | | | Dispersibility | | |
|---|---|---|---|---|---|---|
|  | H.C. | Amide | Amine | Intestinal | Gastric | Rumen |
| 1 | 83.63 | 12.66 | 3.71 | D | N | N |
| 2 | 83.11 | 14.73 | 2.16 | D | D | N |
| 3 | 80.74 | 17.10 | 2.16 | N | D | N |
| 4 | 78.96 | 18.92 | 2.12 | D | D | N |
| 5 | 81.65 | 17.05 | 1.30 | N | N | N |
| 6 | 83.85 | 13.16 | 2.99 | D | D | N |
| 7 | 81.49 | 14.60 | 3.51 | D | D | N |
| 8 | 85.07 | 10.98 | 3.95 | D | N | N |
| 9 | 86.97 | 9.07 | 3.96 | D | N | N |
| 10 | 85.92 | 8.43 | 5.65 | N | N | N |
| 11 | 81.59 | 11.14 | 7.27 | D | D | N |
| 12 | 79.00 | 17.82 | 3.18 | D | D | D |
| 13 | 84.10 | 9.93 | 5.97 | D | D | N |
| 14 | 82.70 | 15.60 | 1.70 | N | N | N |
| 15 | 82.48 | 13.95 | 3.57 | D | D | N |
| 16 | 87.11 | 8.06 | 4.83 | N | N | N |
| 17 | 84.73 | 10.40 | 4.87 | D | D | N |
| 18 | 82.75 | 12.40 | 4.85 | D | D | N |
| 19 | 79.80 | 19.60 | 1.50 | N | N | D |
| 20 | 80.01 | 18.80 | 1.19 | N | N | D |
| 21 | 81.24 | 11.83 | 6.93 | D | D | N |
| 22 | 80.98 | 13.95 | 5.07 | D | D | N |
| 23 | 83.00 | 10.00 | 7.00 | D | D | N |
| 24 | 84.60 | 8.20 | 7.20 | N | D | N |
| 25 | 85.73 | 9.90 | 4.37 | D | D | N |
| 26 | 82.32 | 11.70 | 5.98 | D | D | N |
| 27 | 81.07 | 10.76 | 8.17 | D | D | N |
| 28 | 84.01 | 11.60 | 4.39 | D | D | N |
| 29 | 84.70 | 10.40 | 4.90 | N | N | N |
| 30 | 82.57 | 12.40 | 4.73 | D | D | N |
| 31 | 82.50 | 13.95 | 3.55 | D | D | N |
| 32 | 83.09 | 13.60 | 3.31 | D | D | N |
| 33 | 80.67 | 15.10 | 4.23 | D | D | N |

TABLE II.—CONTINUED

| Resin No. | Composition, percent | | | Dispersibility | | |
|---|---|---|---|---|---|---|
|  | H.C. | Amide | Amine | Intestinal | Gastric | Rumen |
| 34 | 80.85 | 16.25 | 2.90 | D | D | N |
| 35 | 82.10 | 15.40 | 2.50 | D | D | N |
| 36 | 81.70 | 16.30 | 2.00 | N | N | N |
| 37 | 80.02 | 13.00 | 6.98 | D | D | N |
| 38 | 79.61 | 17.92 | 2.47 | D | D | N |
| 39 | 77.88 | 20.85 | 1.27 | D | D | D |
| 40 | 80.75 | 16.80 | 2.45 | D | D | N |
| 41 | 80.90 | 16.10 | 3.00 | D | D | N |
| 42 | 80.53 | 14.10 | 5.37 | D | D | N |
| 43 | 82.37 | 12.30 | 5.33 | D | D | N |
| 44 | 80.18 | 17.40 | 2.42 | D | D | N |
| 45 | 81.00 | 12.50 | 6.50 | D | D | N |
| 46 | 81.38 | 15.7 | 2.92 | D | D | N |
| 47 | 82.13 | 11.6 | 6.27 | D | D | N |

In the above Table II and symbol "N" means the polymer is not dispersible and the symbol "D" means it is dispersible in the respective fluids identified at the top of each column. In the column captioned "rumen," "N" means that the polymer is not dispersed or dissolved to an extent greater than 10% in a 24 hour period, thus showing that more than 90% of the barrier remains to provide the desired protection from the effects of the rumen microflora throughout a normal retention period. In the same column the "D" means that the polymer is dispersible or soluble in the rumen fluid to an extent greater than 10% in the 24 hour period, thereby subjecting the active components to the deleterious effects of the rumen fluids.

In the column captioned "gastric," the "N" means that the polymer is not dissolved or dispersed to an extent greater than 50% in gastric fluids within a one hour period, thereby indicating that a part of the content of biologically active component may not be available for providing its intended function in the gastric area. The "D" in the gastric column means dissolution or dispersions of the polymer to an extent greater than 50%.

In the column captioned "intestinal" the "N" indicates that the polymer is not dissolved or dispersed to an extent greater than 50% within a 24 hour period. The "D" however in the intestinal column means that the polymer is dispersed or dissolved and the remaining content of the biologically active component is released for providing its effective activity in the intestine.

It will be observed that the aminopolyamides for most effective use are non-dispersible in the rumen and at least to some extent dispersible in the gastric fluids. However, the dispersibilities of the preferred resins are described by ranges of percentage with maximal and minimal values. Although a resin composition is described as non-dispersible when less than 10% is dispersed in the rumen, compositions dispersed to an extent greater than 10% may also have useful properties, although less than the optimum. Similarly, although it is desirable for the polyamides to be dispersible in the gastric fluids to the extent of at least 50% of their content, some compositions may be useful even though their maximum dispersibilities are less than 50%. Compositions of these types when plotted on the ternary diagram have the percentages of amine, amide and hydrocarbon moieties at or near the limiting boundaries of the preferred operating areas. The useful and optimum compositions for the practice of this invention are defined by the drawing.

The solubility and/or dispersibility in the intestinal fluids are often not significant because, even if the polymer were insoluble and not dispersible in the intestinal tract, most of the useful compounds will have been released prior to entering the intestine. If some of the aminopolyamide remains it would make unavailable only that part of the biologically active component which is still enclosed in the resin. Although the release of the biologically active component in the gastric area is desirable, in most instances the small proportion of the active component which might be released by the intestinal fluid will provide a useful function.

Further details of the practice of this invention are set forth in the following specific examples.

EXAMPLE 1

Phenothiazine (particles 4–5 microns) was mixed with each of several different resins. The following compositions were prepared:

(A)
4.83 parts by weight of phenothiazine
2.00 parts of Resin No. 38

(B)
8 parts by weight of phenothiazine
2 parts of Resin No. 47

(C)
8 parts by weight of phenothiazine
2 parts of Resin No. 40

(D)
8.5 parts by weight of phenothiazone
1.5 parts of Resin No. 26

(E)
8.5 parts by weight of phenothiazine
0.75 parts of Resin No. 40
0.75 parts of Resin No. 26

(F)
85 parts by weight of phenothiazine
15 parts of Resin No. 7

(G)
85 parts by weight of phenothiazine
15 parts of Resin No. 11

(H)
80 parts by weight of phenothiazone
20 parts of Resin No. 3

Each of the resins was blended with the phenothiazine on a heated 2-roll mill and after cooling the resulting brittle compositions were ground on a Wiley Mill and screened to separate particles of suitable size (16 to 20 mesh U.S.S.) for use as feed additives. The particles were incorporated in conventional ruminant feeds and fed to sheep. The resin content of the said particles provided a barrier between the phenothiazine and the rumen microflora.

EXAMPLE 2

A commercial soybean meal (50 percent protein) was sieved to remove particles finer than 40 mesh (U.S.S.). Resin No. 26 was thinned with various proportions of tetrahydrofuran. The soybean meal was then stirred with the thinned resin to form uniform blended products, as follows:

(A)
57 parts by weight of soybean meal
3 parts of Resin No. 26
15 parts of tetrahydrofuran (B)
58.5 parts by weight of soybean meal
1.5 parts of Resin No. 47
15 parts of tetrahydrofuran (C)
59.4 parts by weight of soybean meal
0.6 parts of Resin No. 26
15 parts of tetrahydrofuran The resin, soybean meal and tetrahydrofuran mixtures were dried by blowing dry air through the mixtures while stirring, then by storing for 24 hours exposed to air and finally dried in an oven for 30 minutes at 60° C.

EXAMPLE 3

A useful hypoglycemic agent 1-(p-toluyl)-3-n-btuyl-sulfonyl urea was pulverized so as to pass a 100 mesh (U.S.S.) screen. Portions of it were mixed with a number of the above described ominopolyamide resins on a 2-roll mill at a temperature of 140° F. to provide the following formulations:

(A)
5.1 parts by weight of the hypoglycemic agent
0.9 parts by weight of Resin No. 47

(B)
4.8 parts by weight of the hypoglycemic agent
1.2 parts by weight of Resin No. 38

(C)
5.1 parts by weight of the hypoglycemic agent
0.9 parts by weight of Resin No. 28

(D)
6.8 parts by weight of hypoglycemic agent
1.2 parts by weight of Resin No. 35

Particles suitable as feed additives were prepared by the procedures of Examples 1 and 2.

EXAMPLE 4

The following preparations were made by the procedure described in Example 3 except the mixtures of resins and 1-(p-toluyl) - 3 - n-butylsulfonyl urea were milled at 200° C.:

(A)
4.4 parts by weight of the hypoglycemic agent
0.6 parts of polyamide Resin No. 47

(B)
4.5 parts by weight of the hypoglycemic agent
0.5 parts of polyamide Resin No. 47

(C)
4.25 parts by weight of the hypoglycemic agent
0.75 parts of Resin No. 38

(D)
4.4 parts by weight of the hypoglycemic agent
0.6 parts of Resin No. 38

The polyamide resins of Examples 3 and 4 provided coatings or matrices which were unaffected by the rumen fluids but were dispersible in the gastric fluids. When incorporated in ruminant diets they enabled the introduction of the glycemic agent into the digestive system without substantial contact of the hypoglycemic agent with the rumen microflora.

EXAMPLE 5

2-(4'-thiazolyl)benzimidazole was formulated with several different polyamide resins to provide barriers between the rumen microflora and the anthelmintic compound. The formulations were prepared by milling the 2-(4'-thiazolyl)-benzimidazole and a suitable amino-polyamide resin on a 2-roll mill at 180 to 200° F. After the mixtures became homogeneous the rolls were cooled and the compositions removed as continuous sheets. The sheets were cut into strips and cooled to room temperatures or lower. Using a Wiley Mill the resin mixtures were ground to 16 to 20 mesh (U.S.S.) for incorporation into animal feeds. When fed to sheep the coated particle passed the rumen and became available in the gastric area. There was no evidence of inhibition of microflora activity. The compositions studied included:

(A)
6.4 parts by weight of 2-(4'-thiazolyl)benzimidazole
1.6 parts of polyamide Resin No. 38

(B)
6.4 parts of weight of 2-(4'-thiazolyl)benzimidazole
1.6 parts by weight of Resin No. 35

(C)
9.06 parts by weight of 2-(4'-thiazolyl)benzimidazole
1.6 parts by weight of Resin No. 47

EXAMPLE 6

A composition containing 8.5 percent by weight of phenothiazine and 1.5 percent of Resin No. 26 was milled on a heated roll mill. After cooling the resulting brittle composition was ground on a Wiley Mill and sieved to separate the 16 to 20 mesh particles. The particles were placed in nylon bags and incubated successively in the several body fluids; 24 hours in rumen fluids, one hour in the gastric juices and 24 hours in intestinal fluids. The fluids were analyzed to determine the percentage of the original content of phenothiazine released to each fluid. The following observations were made:

| | Percent |
|---|---|
| Rumen | 15.4 |
| Gastric | 65.9 |
| Intestinal | 11.1 |

EXAMPLE 7

Example 6 was repeated except the resin used was a mixture of 0.75 parts of each of Resin No. 26 and Resin No. 40 with 8.5 parts by weight of phenothiazine. The quantity of phenothiazine released by incubation in the three said fluids was determined as follows:

| | Percent |
|---|---|
| Rumen | 15.6 |
| Gastric | 56.9 |
| Intestinal | 7.1 |

EXAMPLE 8

Particles containing 2-(4'-thiazolyl)benzimidazole were also evaluated by the procedure of Example 6. The release of the biologically active component in each of the fluids was found to be:

| | Percent |
|---|---|
| Rumen | 12.1 |
| Gastric | 50.5 |
| Intestinal | 9.1 |

EXAMPLE 9

The procedure of Example 6 was repeated using the resin particles prepared by Example 5(C). The release of the 2-(4'-thiazolyl)benzimidazoles in the several fluids was measured and found to be:

| | Percent |
|---|---|
| Rumen | 5.5 |
| Gastric | 82.9 |
| Intestinal | 6.0 |

What is claimed is:

1. A composition comprising a biologically active substance and an aminopolyamide resin, resistant to the action of rumen microflora, having a composition within area ABCDEF of FIG. 1, said biologically active substance being at least partially enclosed by said aminopolyamide resin.
2. A composition defined by claim 1 wherein the biologically active substance is an anthelmintic.
3. A composition defined by claim 1 wherein the biologically active substance is a hypoglycemic agent.
4. The composition defined by claim 1 wherein the biologically active substance is selected from the group consisting of aminoacids, antibiotics, sedatives, antipyretics, hormones, anthelmintics, antispasmodics, hematics, laxatives, expectorants, nutrients and growth promoting agents.
5. A composition defined by claim 2 wherein the anthelmintic is selected from the group consisting of phenothiazine and 2-(4'-thiazolyl) benzimidazole.
6. A composition defined by claim 3 wherein the hypoglycemic agent is 1-(p-toluyl)-3-n-butyl-sulfonyl urea.

References Cited

UNITED STATES PATENTS

| 3,231,545 | 1/1966 | Vertnik et al. | 260—78 |
| 3,242,141 | 3/1966 | Vertnik et al. | 260—78 |

ALBERT T. MEYERS, Primary Examiner

L. SCHENKMAN, Assistant Examiner

U.S. Cl. X.R.

424—247, 270, 322